(12) United States Patent
Onuma

(10) Patent No.: US 7,959,217 B2
(45) Date of Patent: Jun. 14, 2011

(54) MODIFIED UPPER REAR DOOR HINGE PATCH

(75) Inventor: Takashi Onuma, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 219 days.

(21) Appl. No.: 12/191,349

(22) Filed: Aug. 14, 2008

(65) Prior Publication Data
US 2010/0038928 A1    Feb. 18, 2010

(51) Int. Cl.
*B62D 25/02*    (2006.01)
(52) U.S. Cl. ............ 296/187.12; 49/502; 296/203.01; 296/203.03; 296/202; 296/146.11
(58) Field of Classification Search ........ 296/187.03, 296/187.12, 187.13, 196.06, 203.01, 146.11, 296/146.5, 146.6, 193.01, 193.05, 193.06, 296/202; 49/502
See application file for complete search history.

(56) References Cited

U.S. PATENT DOCUMENTS

| | | | |
|---|---|---|---|
| 5,246,264 A | 9/1993 | Yoshii | |
| 5,382,071 A * | 1/1995 | Enning et al. | 296/203.03 |
| 5,586,799 A * | 12/1996 | Kanemitsu et al. | 296/203.02 |
| 5,984,402 A | 11/1999 | Takeuchi | |
| 6,129,410 A * | 10/2000 | Kosaraju et al. | 296/187.12 |
| 6,199,907 B1 * | 3/2001 | Mugford et al. | 280/751 |
| 6,279,990 B1 * | 8/2001 | Miyasaka et al. | 296/203.03 |
| 6,332,643 B1 * | 12/2001 | Sukegawa et al. | 296/203.03 |
| 6,607,239 B1 | 8/2003 | Fuji | |
| 6,808,225 B2 * | 10/2004 | Moriyama | 296/146.6 |
| 7,152,914 B2 | 12/2006 | Dingman et al. | |
| 7,331,626 B2 | 2/2008 | Yoshimoto et al. | |
| 7,344,185 B2 * | 3/2008 | Wright | 296/187.05 |
| 7,510,234 B2 * | 3/2009 | Ameloot et al. | 296/187.12 |
| 2002/0171261 A1 * | 11/2002 | Barz | 296/187 |
| 2004/0195863 A1 * | 10/2004 | Saeki | 296/203.01 |
| 2005/0189790 A1 | 9/2005 | Chernoff et al. | |

FOREIGN PATENT DOCUMENTS

| | | | |
|---|---|---|---|
| JP | 2000351387 A | * | 12/2000 |
| KR | 97035049 | * | 7/1997 |
| KR | 200040367 | * | 7/2000 |

* cited by examiner

*Primary Examiner* — Glenn Dayoan
*Assistant Examiner* — Pinel E Romain
(74) *Attorney, Agent, or Firm* — Mark E. Duell, Esq.; Emerson Thomson Bennett

(57) ABSTRACT

The attachment of a modified upper rear door hinge patch to the outside surface of a center pillar stiffener creates an energy absorbing cavity that: 1) reduces the chances that the center pillar stiffener will buckle or kink in a side impact collision, and 2) improves door mounting accuracy apart from the center pillar stiffener, and 3) improves the formability of the steel used in the manufacture of center pillar stiffeners.

12 Claims, 9 Drawing Sheets

MODIFIED UPPER REAR DOOR HINGE PATCH

I. BACKGROUND OF THE INVENTION

The use of center pillar support structures in an automotive vehicle's side body structure is well known in the art. The typical center pillar support structure consists of one or more vertically positioned metal pieces extending from the vehicle's floor pan and rocker panel up to the vehicle's roof. The center pillar support structure is capable of supporting rear door hinge devices pivotally attached to a rear door, and usually accepts a striker that engages a latch on a vehicle's front door in order to releasably maintain the front door in a closed position. Generally, center pillar structures also define the areas of access to the passenger compartment through the front and rear doors, act as a columnar support structure between a vehicle's upper roof rail and lower side sill, and protect the vehicle's passengers against a side impact collision. Oftentimes, the center pillar structure provides additional protection against side impacts by integrating additional support members, such as reinforcing ribs (U.S. Pat. No. 6,607,239) or vertical reinforcement pillars (U.S. Pat. No. 5,246,264), inside the center pillar structure.

Many existing versions of a center pillar support structure are comprised of both an exterior side body panel made of mild steel, and an interior center pillar structure made of either high strength steel (HSS) or ultra high strength steel (UHSS). The use of HSS or UHSS, however, presents difficulties with the formability of the steel used to manufacture the interior center pillar structures to design specifications. The section of the interior center pillar support structure where an upper door hinge is attached, for example, is typically deep and narrow in geometry because it must meet a door hinge mounting surface on the exterior side body panel. This geometry makes it difficult to shape the HSS or UHSS to design specifications, and additionally creates problems with door hinge mounting accuracy that have previously been difficult to resolve.

The typical design for a center pillar support structure is also vulnerable to buckling or kinking during a side impact collision, causing damage to the vehicle's frame that is expensive and difficult to repair. Most center pillar structures, for example, become narrower as they move from their attachment point at the base of the lower side sill or floor pan to their attachment point at the upper roof rail; this narrowing is utilized in part to minimize obstruction of the view through the door windows. As a result, because the upper portion of the center pillar is smaller and narrower than at the pillar's base, it is not capable of absorbing as much energy as the lower portion of the pillar. During a side impact collision, energy is transferred from the rear door to the vehicle frame mainly through upper and lower door hinge patches mounted on the inside surface of the interior center pillar structure. Thus, if the upper door hinge patch has to absorb too much energy during a side impact, the upper portion of the center pillar structure tends to buckle or kink before the lower door hinge patch can assist in dispersing the side impact energy to the rest of the vehicle frame.

II. SUMMARY OF THE INVENTION

In accordance with one embodiment of the invention, an automotive side body structure comprises: (A) vehicle doors; (B) vehicle door hinge devices operatively attached to the vehicle doors; (C) mounting members passing through openings in the door hinge devices and operatively attaching the doors to an exterior side body panel; (D) an exterior side body panel, having an inside surface facing the passenger compartment, having an outside surface facing an area outside of an associated vehicle; the exterior side body panel being configured to provide structural support and protection for the vehicle's passengers and various vehicle components, and having a shape that is designed to securely receive an associated door in the closed position and define access points to the passenger compartment in an open position; the exterior side body panel comprising: (1) a horizontally positioned lower sill running lengthwise along a side of the associated vehicle, (2) a vertically positioned exterior center pillar structure, the exterior center pillar structure being operatively connected to the lower sill, and having multiple openings configured to accept mounting members, and (3) an upper rail, operatively connected to the exterior center pillar structure, and running substantially parallel to the lower sill along the side of the associated vehicle; (E) an interior center pillar structure, comprising: (1) a center pillar stiffener having an inside surface facing the passenger compartment of the vehicle, and having an outside surface operatively attached to the inside surface of the associated exterior side body panel; (2) a center pillar inner having an inside surface and an outside surface; the center pillar inner operatively connected to the center pillar stiffener and creating a channel between the center pillar stiffener and the center pillar inner; (3) a modified upper rear door hinge patch, having an inside surface and an outside surface, and having at least one opening configured to accept mounting members from a door hinge; the upper rear door hinge patch being operatively connected to an upper rear door hinge patch attachment point on the outside surface of the center pillar stiffener; wherein the attachment configuration creates a cavity between the upper rear door hinge patch and the center pillar stiffener; and (4) a lower rear door hinge patch, operatively connected to the inside surface of the center pillar stiffener, and having at least one opening configured to accept mounting members from a door hinge.

In accordance with another embodiment of the invention, a method for improving the formability of a center pillar stiffener comprises: (A) operatively connecting a modified upper rear door hinge patch to an upper rear door hinge patch attachment point on an outside surface of a center pillar stiffener; (B) wherein the attachment configuration creates a cavity between the upper rear door hinge patch and the center pillar stiffener; (C) thereby reducing the depth of a recess on an inside surface of the center pillar stiffener at the upper rear door hinge mating area.

In accordance with yet another embodiment of the invention, a method for improving the absorption of energy and reducing strain on center pillar structures in side impact collisions comprises: (A) operatively connecting a modified upper rear door hinge patch to an upper rear door hinge patch attachment point on an outside surface of a center pillar stiffener; (B) wherein the attachment configuration creates a cavity between the upper rear door hinge patch and the center pillar stiffener; (C) the upper rear door hinge patch absorbing energy transferred from a side impact collision.

In accordance with yet another embodiment of the invention, a method for improving door hinge mounting accuracy apart from the center pillar stiffener comprises: (A) operatively connecting a modified upper rear door hinge patch to an upper rear door hinge attachment point on an outside surface of a center pillar stiffener; wherein the attachment configuration aligns openings in the modified upper rear door hinge patch with openings in an exterior side body panel; (B) passing mounting members through openings in a door hinge device, through openings in the exterior side body panel, and through openings in the modified upper rear door hinge patch; (C) operatively securing the mounting members with a fastener; the fastener being operatively attached to the mounting members on an inside surface of the modified upper rear door hinge patch.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, at least one embodiment of which will be described in detail in this specification and illustrated in the accompanying drawings which form a part hereof and wherein.

IV. DEFINITIONS

"Passenger compartment" means: The interior portion of an automotive vehicle containing front and/or rear seats; the portion of the vehicle where the driver and/or passengers are seated during operation of the vehicle.

"Door hinge patch" (upper or lower) means: Generally, a flat plate made of steel; designed to stiffen and strengthen the door hinge mounting areas such as the rear door hinge mating areas and rear door hinge attachment points; having openings for accepting door mounting members; and mounted to the inside surface of a center pillar stiffener.

"Modified door hinge patch" means: A component of a center pillar structure made of a plastically deformable material; having a bent shape with an inside surface defining a cavity; mounted to the outside surface of a center pillar stiffener at the upper rear door hinge patch attachment point.

"Upper rear door hinge attachment point" means: A portion of an exterior side body panel where a vehicle door hinge device is mounted; characterized by multiple door hinge mounting openings configured to accept mounting members from a vehicle door's upper rear door hinge device; the door hinge device comes in direct contact with the outside surface of the exterior side body panel at the upper rear door hinge attachment point; the outside surface of a modified upper rear door hinge patch is operatively attached to the inside surface of the exterior side body panel at the upper door hinge attachment point.

"Door hinge mating areas" means: portions of a center pillar stiffener characterized by multiple door hinge mounting openings that are configured to align with the door hinge mounting openings on the exterior side body panel and accept mounting members from a vehicle door's hinge device; the lower rear door hinge patch is attached to the inside surface of the center pillar stiffener at the door hinge mating area; an upper door hinge patch is attached to the inside surface of the center pillar stiffener at the door hinge mating area.

"Upper rear door hinge patch attachment point" means: A portion of the outside surface of a center pillar stiffener where a modified upper rear door hinge patch is attached.

V. DETAILED DESCRIPTION

Figure 1:
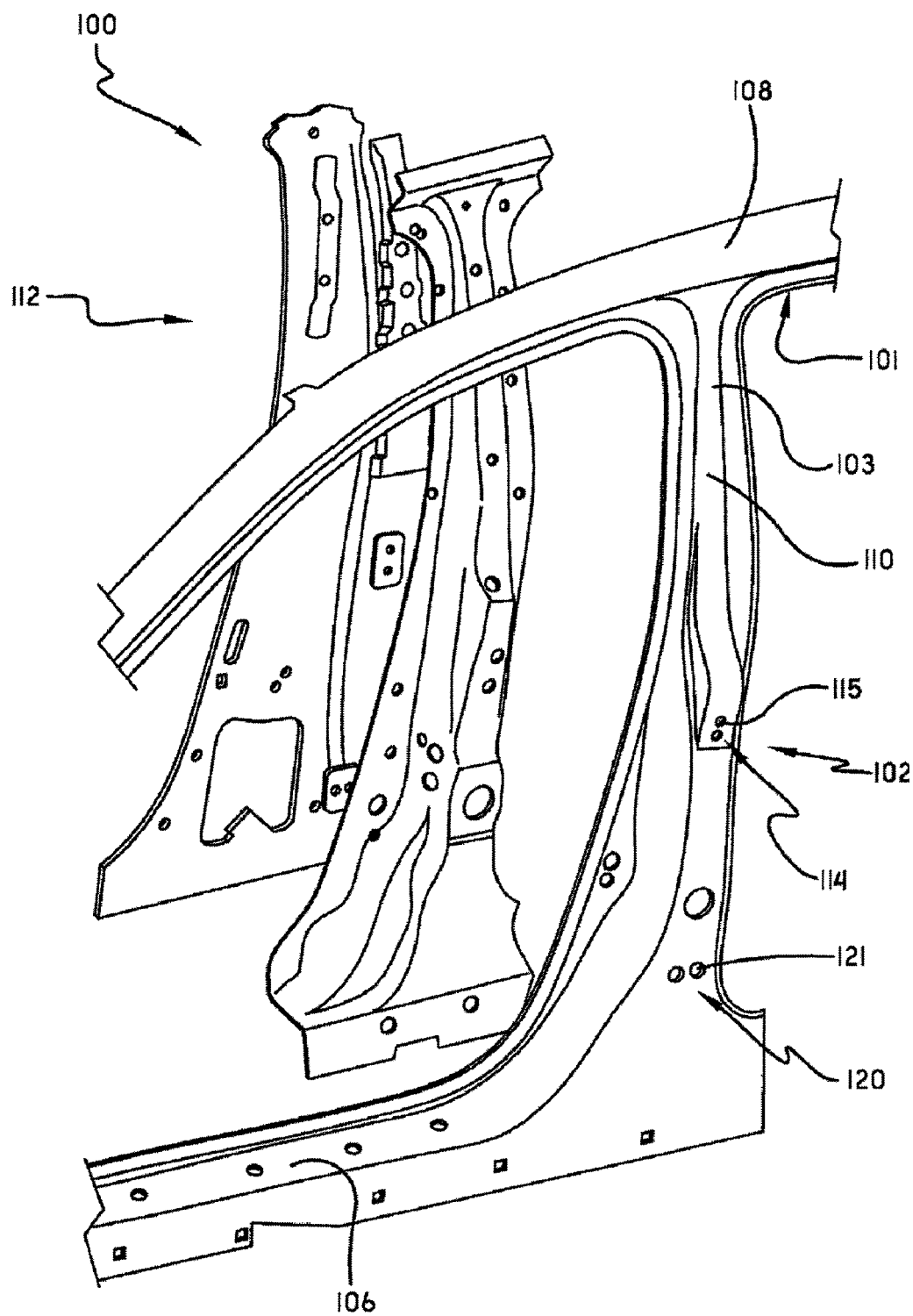
FIG. 1 is a perspective view of a typical prior art automotive vehicle side body structure, illustrating in particular the general position of a center pillar support structure in relation to the corresponding side body panel.

Referring now to the drawings, wherein the showings are for the purposes of illustrating embodiments of the invention only and not for the purposes of limiting the same, FIG. 1 illustrates a typical prior art side body structure 100 for an automotive vehicle 105. Most side body structures consist of an exterior side body panel 102 and an interior center pillar structure 122; the two structures being operatively connected in such a fashion that the vehicle's side body structure 100 provides support for the vehicle's doors 107 and roof (shown but not referenced), while also providing some measure of protection to the vehicle's passengers from weather, road debris, and side impact collisions.

The exterior side body panel 102 shown in FIG. 1 has a lower sill 106 running horizontally between a front wheel well (not shown) and a rear wheel well (not shown) along a lengthwise side of the vehicle 105. The exterior side body panel 102 also has an upper rail 108 that runs generally parallel to the lower sill 106 lengthwise along the side of the vehicle 105. A vertically positioned exterior center pillar structure 110 extends from the mid portion of the lower sill 106 to the mid portion of the upper rail 108, and defines access points to the vehicle's passenger compartment 112.

The exterior side body panel 102, comprising the three component parts described above, has an inside surface 101 that faces the vehicle's passenger compartment 112, and an outside surface 103 that faces an area outside of the vehicle 105. In the version illustrated in FIG. 1, the outside surface 103 of the exterior center pillar structure 110 has an upper rear door hinge attachment point 114, characterized by multiple door hinge mounting openings 115 configured to accept mounting members 116 from openings 170 in a vehicle door's 107 upper rear door hinge device 118 (116, 107 and 118 not shown). FIG. 1 also shows a lower rear door hinge attachment point 120 with multiple door hinge mounting openings 121 configured to accept mounting members 116 from openings 172 in a lower rear door hinge device 119. Note that the inside surface 101 of the exterior center pillar structure 110 at the upper rear door hinge attachment point 114 is characterized by a deep and narrow geometry relative to the inside surface 101 of the exterior center pillar structure 110 at the lower rear door hinge attachment point 120. The exterior side body panel 102 is reinforced with an interior center pillar structure 122 operatively attached to the inside surface 101 of the exterior side body panel 102.

Figure 2:
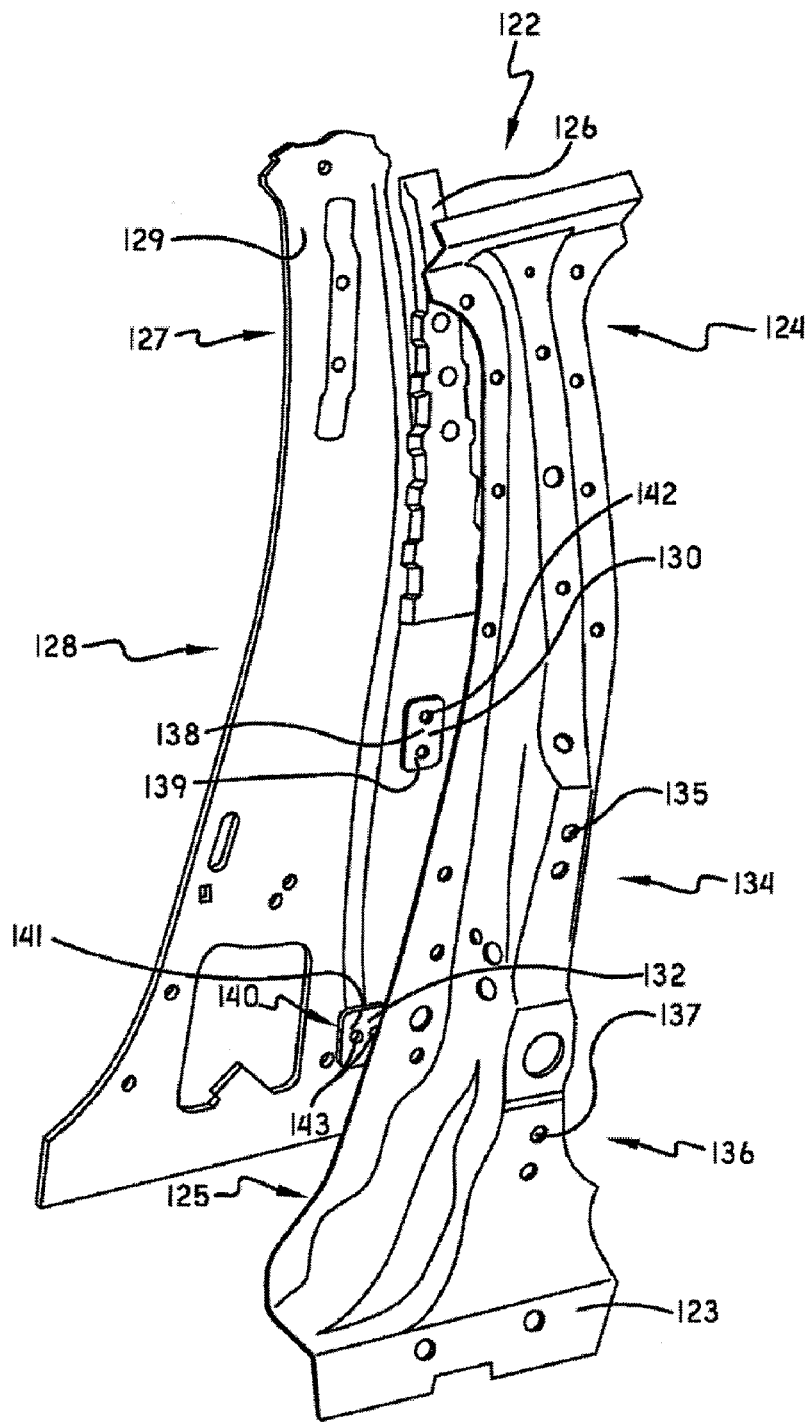
FIG. 2 is an enlarged, isolated, perspective view of a typical prior art center pillar support structure.

FIG. 2 is an enlarged illustration of a typical interior center pillar structure 122 and its component parts: a center pillar stiffener 124, a center pillar reinforcement 126, a center pillar inner 128, an upper rear door hinge patch 130, and a lower rear door hinge patch 132.

The center pillar stiffener 124 illustrated in FIG. 2 has an outside surface 123 facing the area outside of the vehicle 105 and an inside surface 125 facing the vehicle's passenger compartment 112. The shape of the center pillar stiffener 124 is designed to mate with the exterior side body panel 102; when assembled, the outside surface 123 of the center pillar stiffener 124 is operatively attached to the inside surface 101 of the exterior center pillar structure 110. The center pillar stiffener 124 also has upper and lower rear door hinge mating areas 134 and 136, characterized by multiple door hinge mounting openings 135 and 137, configured to align with the door hinge mounting openings 115 and 121 on the exterior side body panel 102, and accept mounting members 116 from a vehicle door's 107 rear door hinge devices 118 and 119. Note that in the version illustrated in FIG. 1 and FIG. 2, the inside surface 125 of the center pillar stiffener 124 at the upper rear door hinge mating area 134 has a deep and narrow geometry that corresponds with the deep and narrow geometry found on the inside surface 101 of the exterior side body panel 102 at the upper rear door hinge attachment point 114.

With continued reference to FIG. 2, the interior center pillar structure 122 also has a center pillar inner 128 that provides additional structural strength. The center pillar inner 128 has an inside surface 127 facing the vehicle's passenger compartment 112 and an outside surface 129 facing the area outside of the vehicle 105. The outside surface 129 of the center pillar inner 128 is operatively attached to the inside surface 125 of the center pillar stiffener 124. In contrast to the relatively snug coupling of the exterior side body panel 102 to the center pillar stiffener 124, when the center pillar inner 128 and center pillar stiffener 124 are operatively attached there is a channel between the two components that houses additional support and reinforcement devices.

In some existing interior center pillar structures, the channel between the center pillar stiffener 124 and the center pillar inner 128 contains a center pillar reinforcement 126. The center pillar reinforcement 126 is typically operatively mounted to the outside surface 129 of the center pillar inner 128. The center pillar reinforcement 126 is designed to provide additional structural strength to the interior center pillar structure 122 at a relatively weak area—the narrow strip separating the front door window and rear door window (both shown, but not referenced).

The channel between the center pillar stiffener 124 and the center pillar inner 128 shown in FIG. 2 also contains an upper rear door hinge patch 130 and a lower rear door hinge patch 132. The rear door hinge patches 130 and 132 are designed to stiffen and strengthen the door hinge mating areas 134 and 136. The upper rear door hinge patch 130 has an inside surface 138 facing the passenger compartment 112 and an outside surface 139 facing an area outside the vehicle 105. The upper rear door hinge patch 130 is typically a flat plate configured to be mounted within the narrow and deep geometry found on the inside surface 125 of the center pillar stiffener 124 at the upper rear door hinge mating area 134. The upper rear door hinge patch 130 has openings 142 for receiving door attachment mounting members 116; the openings 142 being configured to align with the openings 115 and 135 for receiving door attachment mounting members 116 on both the exterior side body panel 102 and the center pillar stiffener 124. The lower rear door hinge patch 132 is a plate with an inside surface 140 facing the passenger compartment 112 and an outside surface 141 facing an area outside of the vehicle 105, with openings 143 for receiving door mounting members 116. The lower rear door hinge patch 132 is operatively mounted to the inside surface 125 of the center pillar stiffener 124 at the lower rear door hinge mating area 136.

In a typical vehicle door mounting configuration, at least one door hinge device 118 is operatively mounted on the vehicle door 107 so that the vehicle door 107 is pivotally movable between an open position and a closed position when the door hinge device 118 is also operatively mounted to the vehicle side body structure 102. In FIG. 1, for example, mounting a rear vehicle door 107 to the side body structure 102 would involve passing mounting members 116 (such as a bolt, for example) through openings 170 and 172 in the door hinge devices 118 and 119, the exterior side body panel 115 and 121, the center pillar stiffener 135 and 137, and the door hinge patches 142 and 143—and then securing the mounting members 116 in position with a fastener (such as a nut, as a non-limiting example) tightened onto the inside surfaces 138 and 140 of the door hinge patches 130 and 132.

Figure 3:
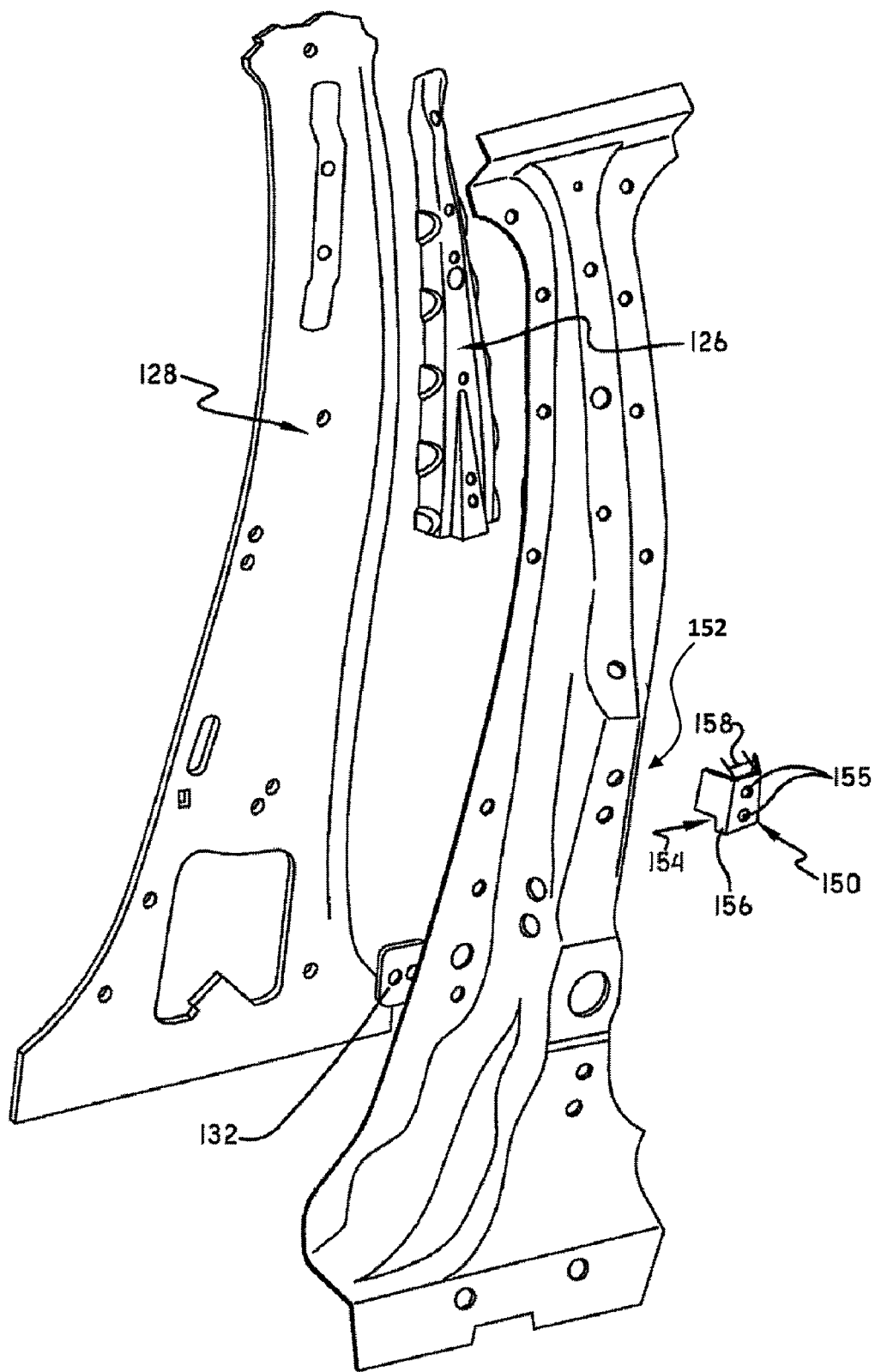
FIG. 3 is a perspective view of a center pillar support structure embodiment according to this invention.
Figure 3A:
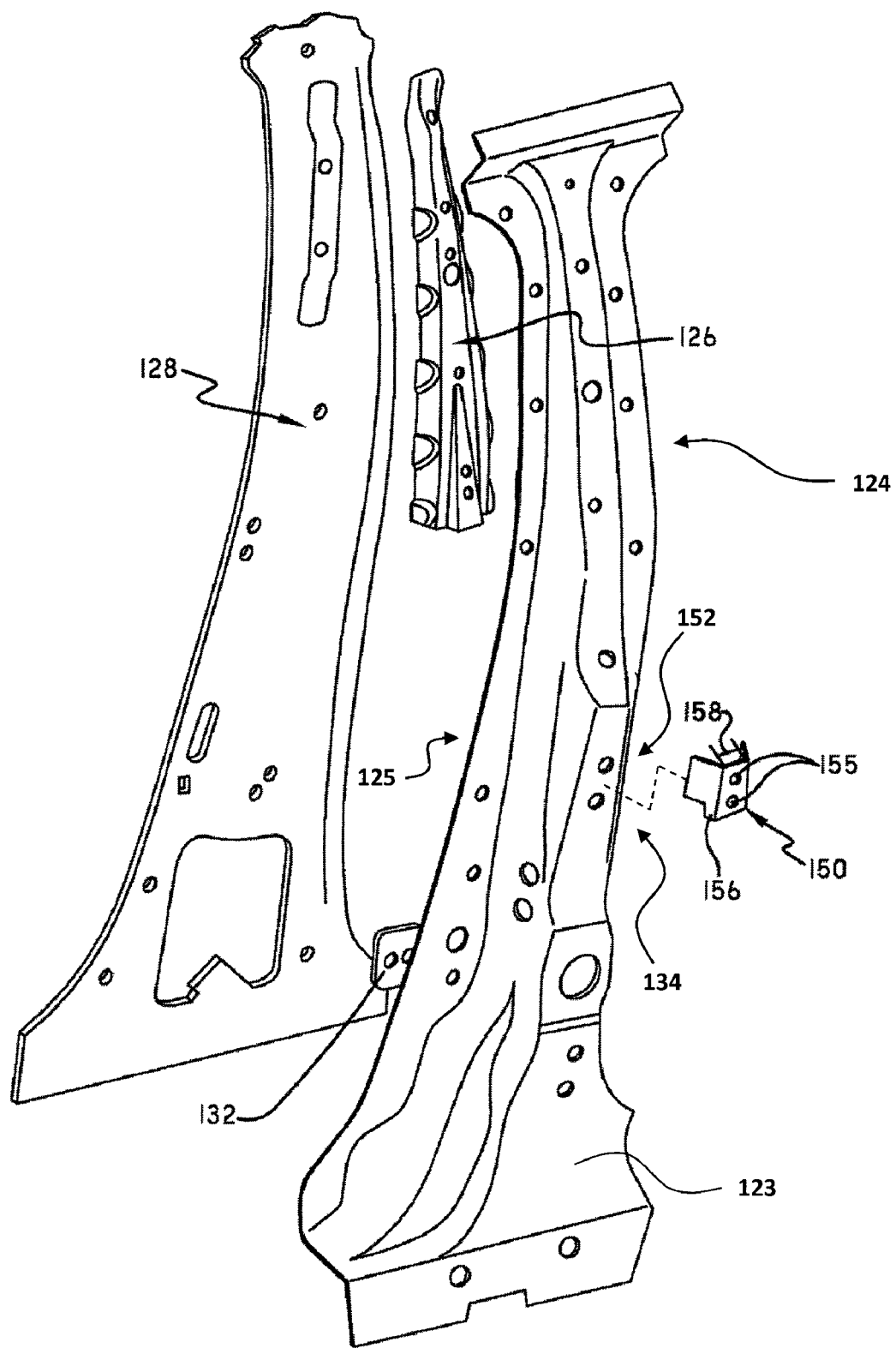
FIG. 3A is an assembly view of a center pillar support structure, according to one embodiment.
Figure 3B:
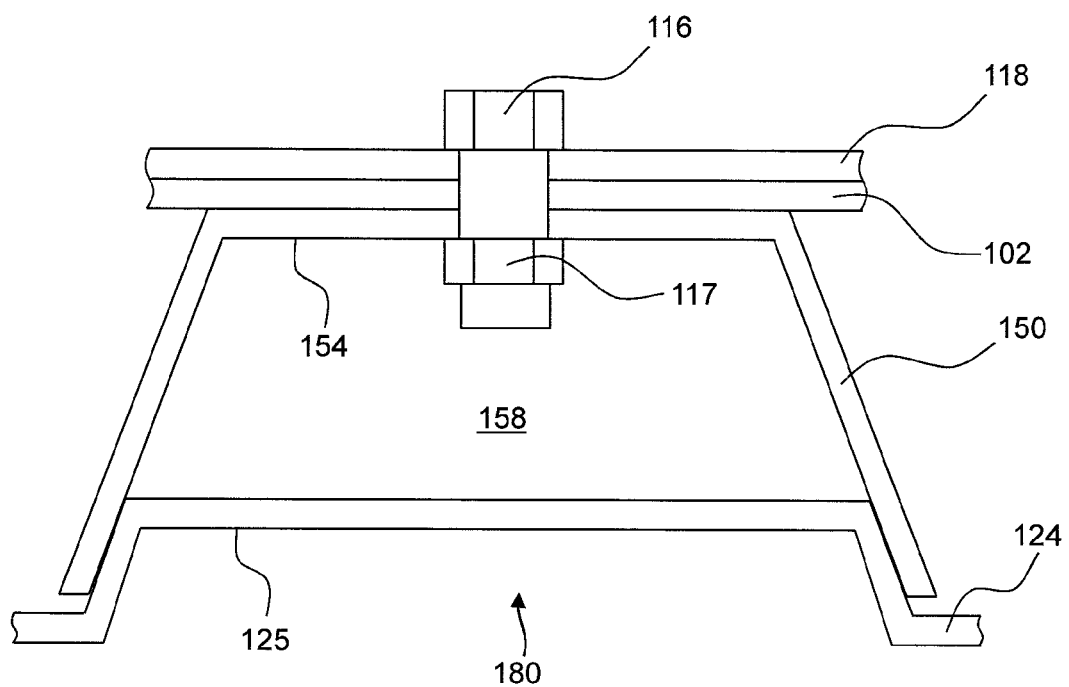
FIG. 3B is a cross-sectional view of a center pillar support structure, according to one embodiment.
Figure 4:
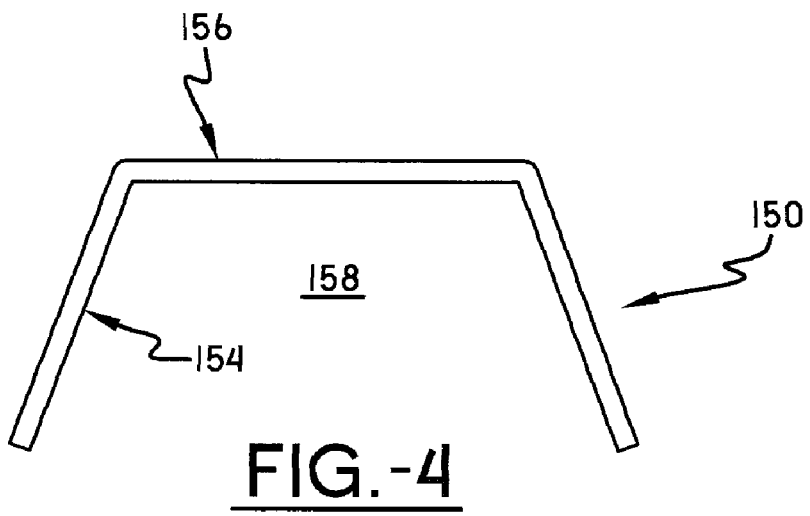
FIG. 4 is a cross-sectional view of one embodiment of the current invention.
Figure 5:
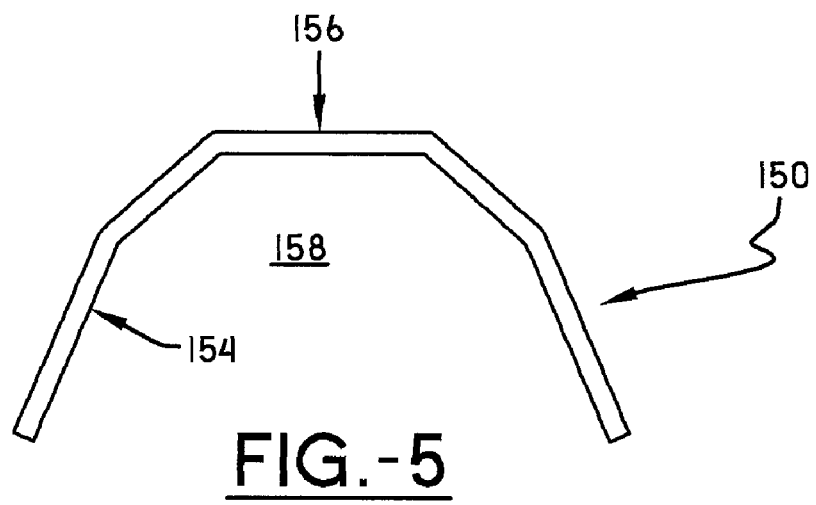
FIG. 5 is a cross-sectional view of another embodiment of the current invention.
Figure 6:
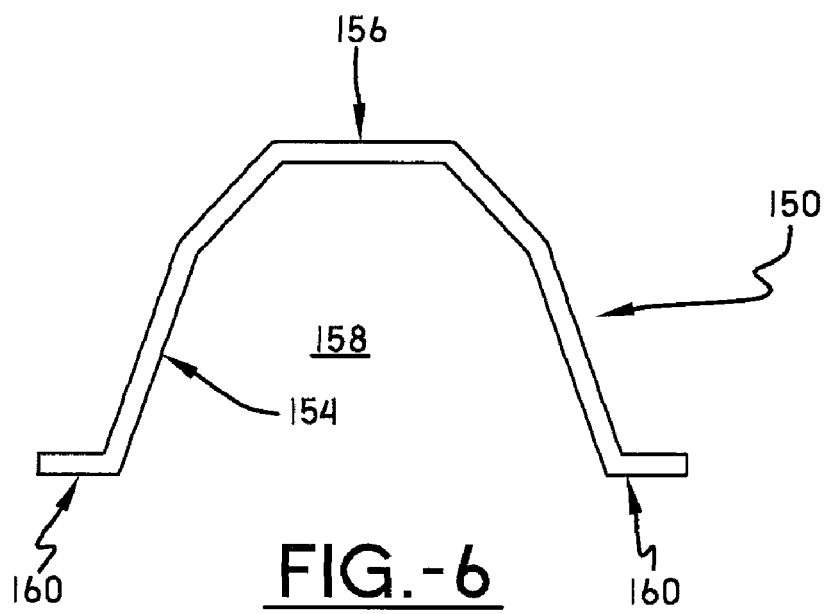
FIG. 6 is a cross-sectional view of another embodiment of the current invention.
Figure 7:
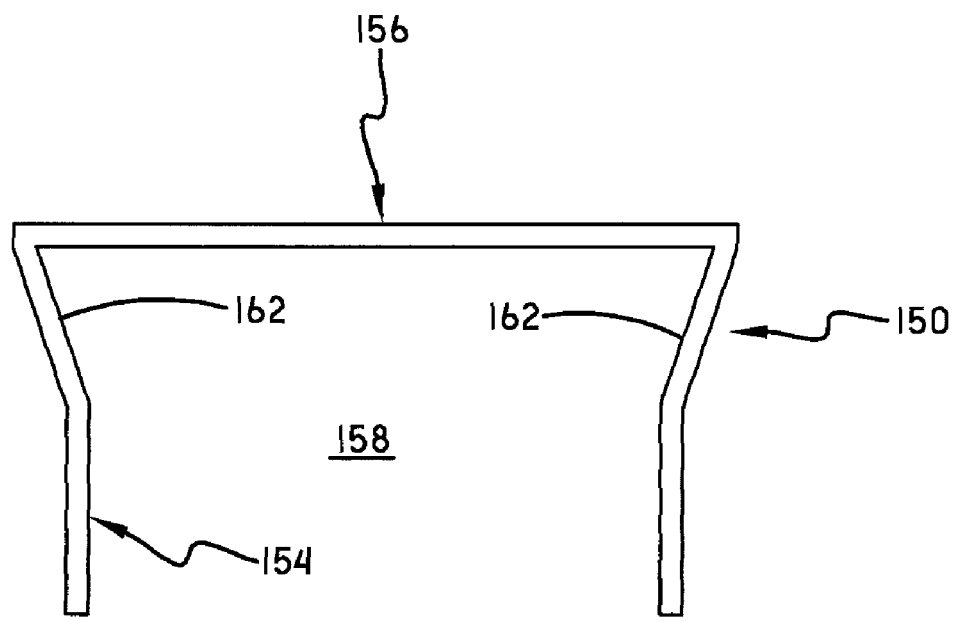
FIG. 7 is a cross-sectional view of another embodiment of the current invention.
Figure 8:
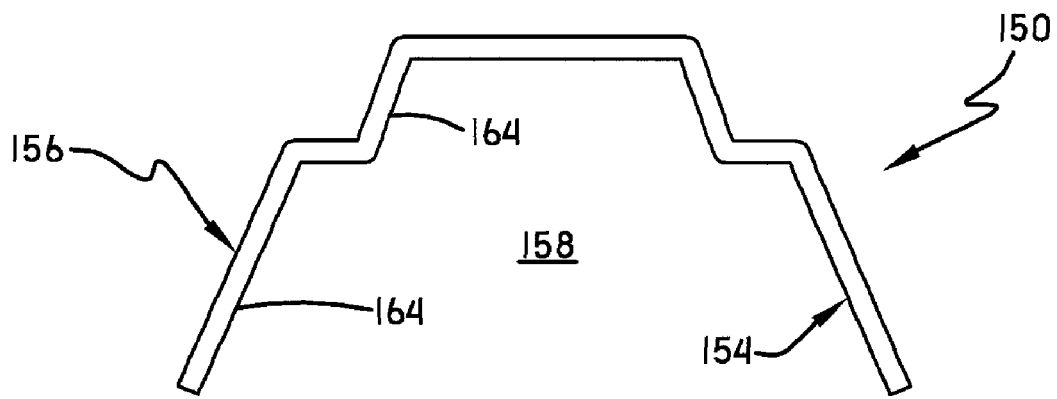
FIG. 8 is a cross-sectional view of another embodiment of the current invention.
Figure 9:
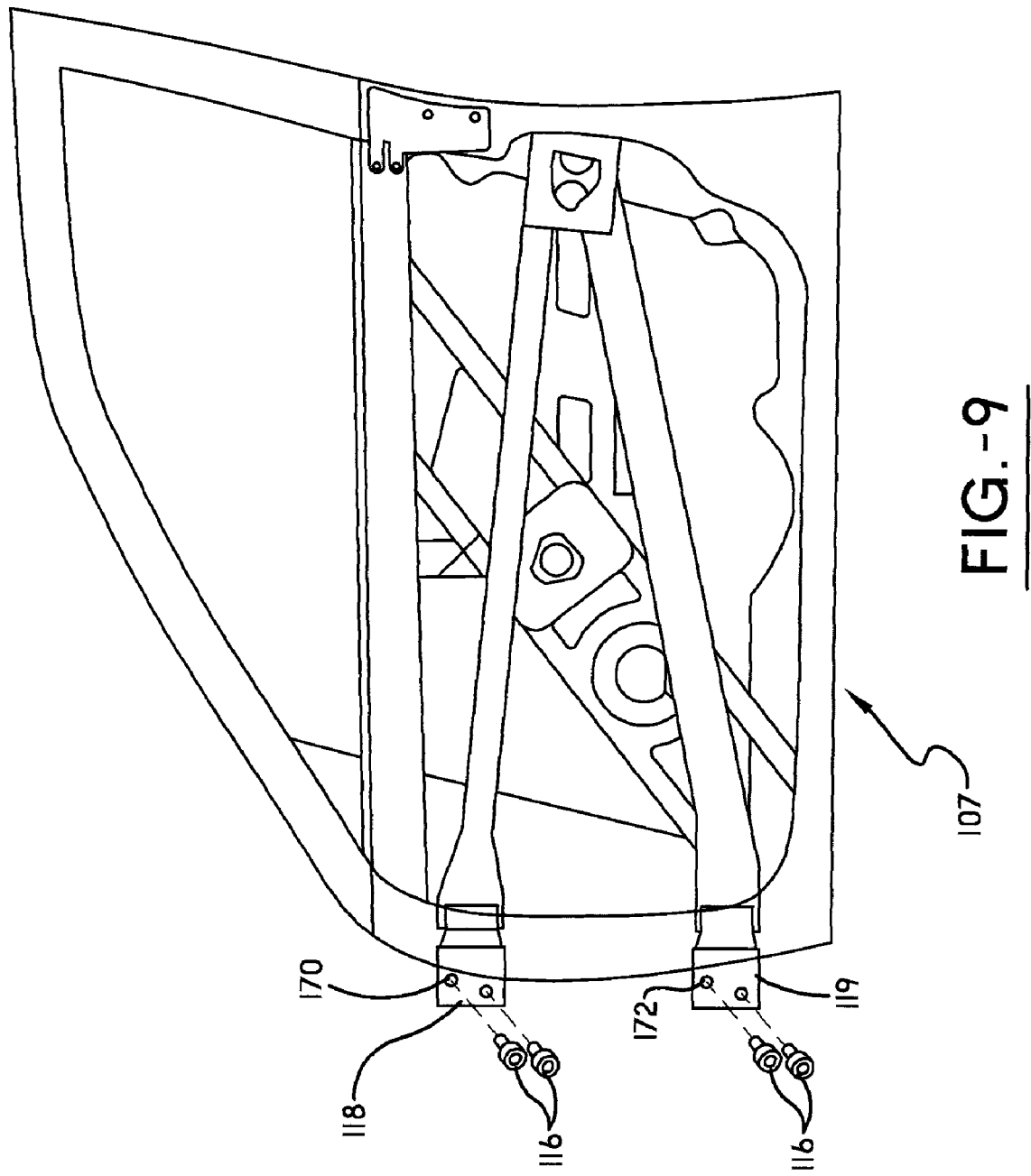
FIG. 9 is an automotive vehicle door with door hinge devices and mounting members.
Figure 10:
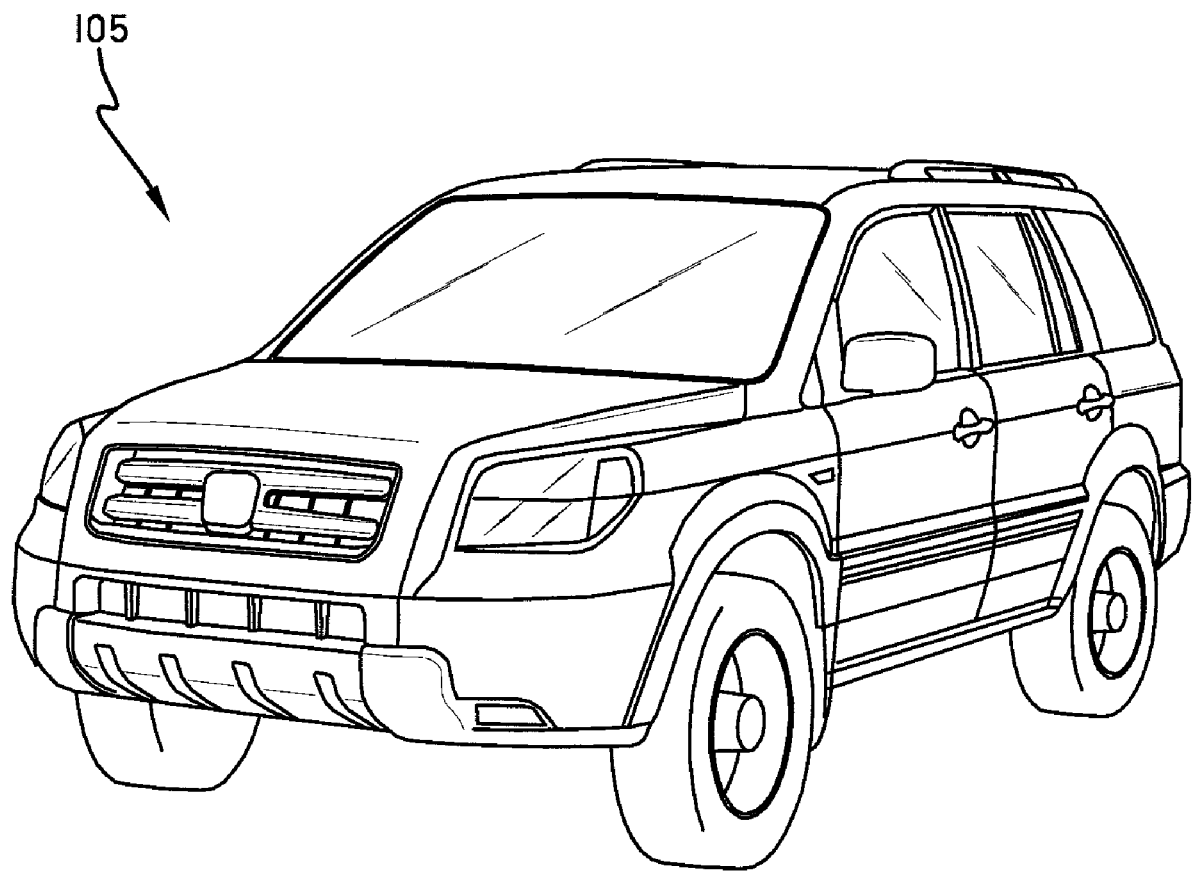
FIG. 10 is an automotive vehicle.

But with reference now to FIGS. 3, 3A, and 3B, showing one embodiment of the current invention, replacing the typical upper rear door hinge patch 130 with a modified upper rear door hinge patch 150 improves the formability of the high strength steel used in the manufacture of the center pillar stiffener 124, improves door hinge 118 mounting accuracy, and reduces the chances that the interior center pillar structure 122 will kink or buckle during a side impact collision. Referring to FIGS. 3, 3A, and 3B, the basic interior center pillar structure 122 has a modified upper rear door hinge patch 150 mounted on the outside surface 123 of the center pillar stiffener 124 at an upper rear door hinge patch attachment point 152, in contrast to the traditional mounting position of an upper rear door hinge patch 130 on the inside surface 125 of the center pillar stiffener 124 at the upper rear door hinge mating area 134.

This modified upper rear door hinge patch 150 can take many shapes, several of which are illustrated in FIGS. 4-8. When operatively attached to the outside surface 123 of the center pillar stiffener 124 at the upper rear door hinge patch attachment point 152, the modified upper rear door hinge patch 150 has an inside surface 154 that faces the passenger compartment 112 and defines the cavity 158, and an outside surface 156 that faces an area outside of the vehicle 105. The modified upper rear door hinge patch 150 also has at least one opening 155 for receiving door hinge mounting members. In the embodiment shown in FIG. 3, the modified upper rear door hinge patch 150 has a shape substantially similar to that of the center pillar stiffener 124 at the upper door hinge patch attachment point 152. In another embodiment, shown in FIG. 4, the modified upper rear door hinge patch 150 has a generally U-shaped cross-sectional shape that defines a cavity 158. In yet another embodiment, shown in FIG. 5, the modified upper rear door hinge patch 150 has a substantially U-shaped semi-decagonal cross-sectional shape that defines a cavity 158. In another embodiment, shown in FIG. 6, the modified upper rear door hinge patch 150 has a substantially U-shaped semi-decagonal cross-sectional shape with outwardly extending flanges 160. In an embodiment shown in FIG. 7, the modified upper rear door hinge patch 150 has a generally U-shaped cross-sectional shape characterized by acutely angled sidewalls 162. In yet another embodiment, shown in FIG. 8, the modified upper rear door hinge patch 150 has a generally U-shaped cross-sectional shape characterized by obtusely angled step-like sidewalls 164. But it is to be understood that the modified upper rear door hinge patch 150 can take any shape chosen with sound engineering judgment, as long as it has at least three flat mounting surfaces defining a bent shape with a cavity 158 when attached to the outside surface 123 of the center pillar stiffener 124.

With continued reference to FIGS. 3, 3A, and 3B, the modified upper rear door hinge patch 150, and the cavity 158 created by its attachment to the outside surface 123 of the center pillar stiffener 124, now occupy the inside surface 101 of the exterior center pillar structure 110 at the traditionally deep and narrow geometric recess found at the upper door hinge attachment point 152. The insertion of the modified upper rear door hinge patch 150 onto the outside surface 123 of the center pillar stiffener 124 reduces the depth of the recess 180 on the inside surface 125 of the center pillar stiffener 124 at the upper door hinge mating area 134, because the center pillar stiffener 124 no longer has to directly meet the inside surface 101 of the exterior center pillar structure 110 at the upper door hinge attachment point 152—where the geometry of the exterior center pillar structure 110 is deep and narrow. As a result, the high strength steel of the center pillar stiffener 124 has improved formability because it does not need to be formed with such a deep geometry at the upper rear door hinge mating area 134.

The use of the modified upper rear door hinge patch 150 also improves door hinge 118 mounting accuracy. In the prior art, the poor formability of the HSS or UHSS of the center pillar stiffener 124 made it difficult to align and pass door hinge mounting members 116 through openings in the door hinge devices 118 and 119, the exterior side body panel 115 and 121, the center pillar stiffener 135 and 137, and the door hinge patches 142 and 143 before securing the mounting members 116 in position with a fastener (such as a nut, for example) tightened onto the inside surfaces 138 and 140 of the door hinge patches 130 and 132. But by mounting a modified upper rear door hinge patch 150 onto the outside surface 123 of the center pillar stiffener 124, the mounting members 116 do not have to pass through the center pillar stiffener 124 in order to operatively mount the vehicle door 107. Instead, the mounting members 116 need only pass through openings in the door hinge devices 118 and 119, the exterior side body panel 115, and the modified upper rear door hinge patch 150; whereafter the mounting member 116 can be secured with a fastener 117 that is tightened directly onto the inside surface 154 of the modified upper rear door hinge patch 150, as shown in FIG. 3B. In this vehicle door mounting configuration, door hinge 118 mounting accuracy is improved because the modified upper rear door hinge patch 150 is easily positioned to align its openings 155 for the receipt of mounting members 116.

The mounting of the modified upper rear door hinge patch 150 on the outside surface 123 of the center pillar stiffener 124 also reduces the possibility that the interior center pillar structure 122 will kink or buckle during a side impact collision. In the event of a side impact collision, energy is normally transferred from the rear door 107 to the interior center pillar structure 122 and the vehicle frame primarily through the upper rear door hinge patch 130 and the lower rear door hinge patch 132. Because, as shown in FIG. 2, the upper portions of the interior center pillar structure 122 are smaller and narrower than at the base of the interior center pillar 122, they are not capable of absorbing as much energy as the lower portion of the interior center pillar structure 122. Thus, if the upper rear door hinge patch 130 has to absorb too much energy during a side impact, the upper portion of the center pillar structure 122 tends to buckle or kink before the lower rear door hinge patch 132 can assist in dispersing the side impact energy to the rest of the vehicle frame. The energy absorbing cavity 158 created with the addition of a modified upper rear door hinge patch 150 on the outside surface 123 of the center pillar stiffener 124, however, allows the modified upper rear door hinge patch 150 to crush before it comes in contact with the center pillar stiffener 124, thereby absorbing energy, and reducing the possibility of kinking or buckling of the interior center pillar structure 124.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A vehicle side body structure for use with an associated vehicle having a passenger compartment with driver side and passenger side front and rear seats, the vehicle side body structure comprising:
   at least two vehicle doors;
   at least two vehicle door hinge devices, operatively attached to the vehicle door, and having at least one opening configured to accept mounting members;
   at least two mounting members for each door, the mounting members passing through openings in the door hinge devices in a manner wherein the vehicle door is operatively attached to, and pivotally movable within, an exterior side body panel;
   an exterior side body panel, having an inside surface facing the passenger compartment, having an outside surface facing an area outside of an associated vehicle; the exterior side body panel being configured to provide structural support and protection for the vehicle's passengers and various vehicle components, and having a shape that is designed to securely receive an associated door in the closed position and define access points to the passenger compartment in an open position; the exterior side body panel comprising:
      a horizontally positioned lower sill running lengthwise along a side of the associated vehicle;
      a vertically positioned exterior center pillar structure, the exterior center pillar structure being operatively connected to the lower sill, and having multiple openings configured to accept mounting members, and,
      an upper rail, operatively connected to the exterior center pillar structure, and running substantially parallel to the lower sill along the side of the associated vehicle;
   an interior center pillar structure, comprising:
      a center pillar stiffener having an inside surface facing the passenger compartment of the vehicle, and having an outside surface operatively attached to the inside surface of the associated exterior side body panel;
      a center pillar inner having an inside surface and an outside surface; the center pillar inner operatively connected to the center pillar stiffener and creating a channel between the center pillar stiffener and the center pillar inner;
      a modified upper rear door hinge patch, having an inside surface and an outside surface, and having at least one opening configured to accept mounting members from a door hinge; the modified upper rear door hinge patch being operatively connected to an upper rear door hinge patch attachment point on the outside surface of the center pillar stiffener; wherein the attachment configuration creates a cavity between the modified upper rear door hinge patch and the center pillar stiffener; wherein the mounting members pass through the at least one opening in one of the door hinge devices, through one of the openings in the exterior center pillar structure of the exterior side body panel, and through the at least one opening in the modified upper rear door hinge patch; the mounting members being operatively secured on an inside surface of the modified upper rear door hinge patch and spaced apart from the center pillar stiffener; and, a lower rear door hinge patch, operatively connected to the inside surface of the center pillar stiffener, and having at least one opening configured to accept mounting members from a door hinge.

2. An automotive vehicle side body structure as in claim 1, wherein the interior center pillar structure additionally comprises:

a center pillar reinforcement, the center pillar reinforcement being operatively connected to the outside surface of the center pillar inner.

3. An automotive vehicle side body structure as in claim 1, wherein the modified upper rear door hinge patch has a cross-sectional shape substantially similar to the center pillar stiffener's cross-sectional shape at an upper rear door hinge patch attachment point.

4. An automotive vehicle side body structure as in claim 1, wherein the modified upper rear door hinge patch has a generally U-shaped cross-sectional shape.

5. An automotive vehicle side body structure as in claim 4, wherein the modified upper rear door hinge patch has a substantially U-shaped semi-decagonal cross-sectional shape.

6. An automotive vehicle side body structure as in claim 5, wherein the modified upper rear door hinge patch has a substantially U-shaped semi-decagonal cross-sectional shape with outwardly extending flanges.

7. An automotive vehicle side body structure as in claim 1, wherein the modified upper rear door hinge patch has a generally U-shaped cross-sectional shape characterized by acutely angled sidewalls.

8. An automotive vehicle side body structure as in claim 1, wherein the modified upper rear door hinge patch has a generally U-shaped cross-sectional shape characterized by obtusely angled step-like sidewalls.

9. A method for improving the absorption of energy and reducing strain on center pillar structures in side impact collisions, comprising the steps of:

operatively connecting a modified upper rear door hinge patch to an upper rear door hinge patch attachment point on an outside surface of a center pillar stiffener, wherein the attachment configuration creates a cavity between the modified upper rear door hinge patch and the center pillar stiffener, and wherein the modified upper rear door hinge patch is adapted to absorb energy transferred from an associated side impact collision.

10. A method for improving door hinge mounting accuracy apart from a center pillar stiffener, comprising the steps of:

operatively connecting a modified upper rear door hinge patch to an upper rear door hinge attachment point on an outside surface of a center pillar stiffener; wherein the attachment configuration aligns openings in the modified upper rear door hinge patch with openings in an exterior side body panel;

passing mounting members through openings in a door hinge device, through openings in the exterior side body panel, and through openings in the modified upper rear door hinge patch; and, operatively securing the mounting members with a fastener; the fastener being operatively attached to the mounting members on an inside surface of the modified upper rear door hinge patch; the mounting members spaced apart from the center pillar stiffener.

11. A method for improving the formability of a center pillar stiffener, comprising the steps of:

operatively connecting a modified upper rear door hinge patch to an upper rear door hinge patch attachment point on an outside surface of a center pillar stiffener, wherein the attachment configuration creates a cavity between the modified upper rear door hinge patch and the center pillar stiffener, wherein the attachment configuration aligns openings in the modified upper rear door hinge patch with openings in an exterior side body panel;

reducing the depth of a recess on an inside surface of the center pillar stiffener at the upper rear door hinge attachment point so that the center pillar stiffener is spaced apart from the exterior side body panel at the upper door hinge attachment point;

passing mounting members through openings in a door hinge device, through openings in the exterior side body panel, and through openings in the modified upper rear door hinge patch; and operatively securing the mounting members with a fastener; the fastener being operatively attached to the mounting members on an inside surface of the modified upper rear door hinge patch; the mounting members spaced apart from the center pillar stiffener.

12. The method of claim 9 further comprising the steps of:

wherein the attachment configuration aligns openings in the modified upper rear door hinge patch with openings in an exterior side body panel;

passing mounting members through openings in a door hinge device, through openings in the exterior side body panel, and through openings in the modified upper rear door hinge patch; and operatively securing the mounting members with a fastener; the fastener being operatively attached to the mounting members on an inside surface of the modified upper rear door hinge patch; the mounting members spaced apart from the center pillar stiffener.

* * * * *